March 12, 1968 S. A. TELL 3,372,581
DYNAMOMETER
Filed April 22, 1966
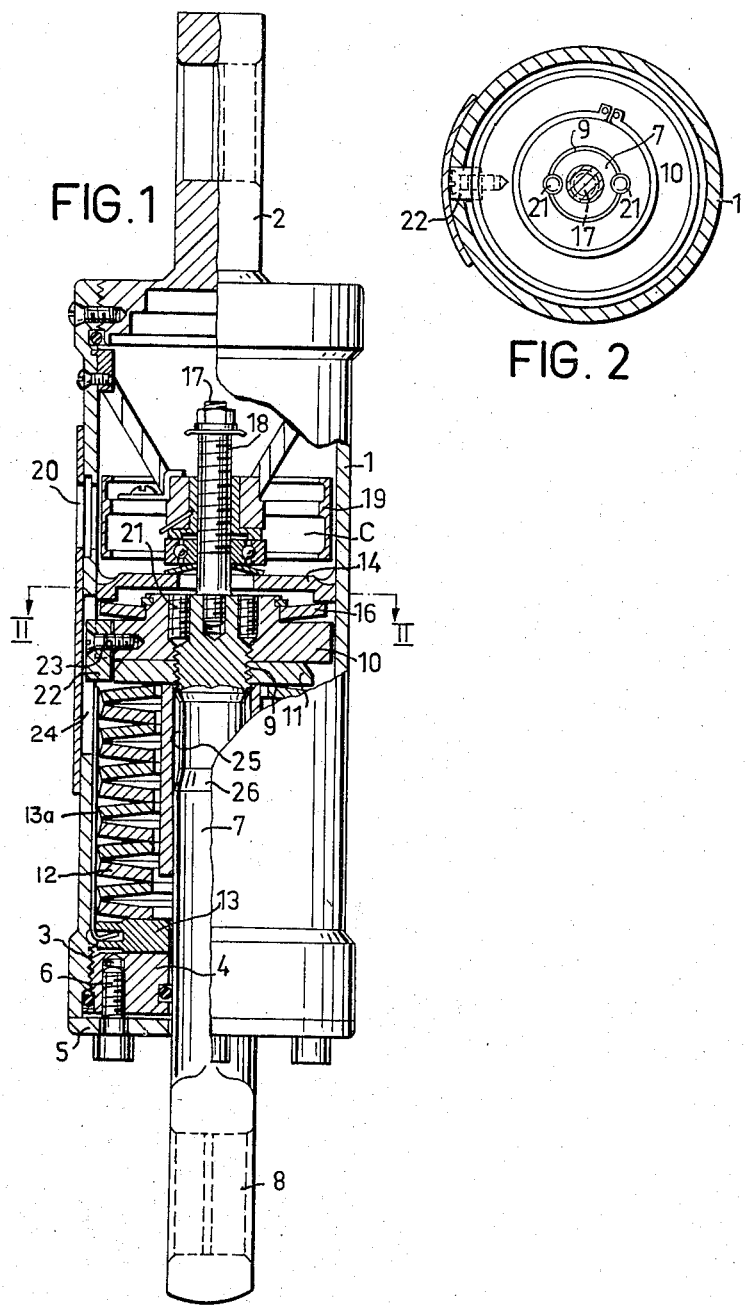
INVENTOR.
SVEN AXEL TELL
BY Young & Thompson
ATTYS.

United States Patent Office 3,372,581
Patented Mar. 12, 1968

3,372,581
DYNAMOMETER
Sven Axel Tell, Vikingavagen 3, Danderyd, Sweden
Filed Apr. 22, 1966, Ser. No. 544,452
Claims priority, application Sweden, Apr. 27, 1965, 5,503/65
6 Claims. (Cl. 73—141)

This invention relates to a dynamometer comprising a casing and a draw-rod longitudinally displaceable in the casing against the action of spring elements, the force to be measured being applied to the draw-rod the longitudinal displacement of which relative to the casing caused by said force being indicated, for instance readable from a measuring scale, wherein the spring elements consist of annular conical disc springs surrounding the draw-rod and arranged between a stop means provided on the draw-rod and a preferably axially adjustable support provided at one end of the casing.

In a prior-art dynamometer of this kind a stop ring provided on the rod is adapted to be held against the disc springs and is screwed onto an upper, greatly reduced-diameter portion of the draw-rod. In the zero position of the measuring scale the stop ring is supported against a shoulder of the draw-rod. In this position the stop ring is locked by means of a laterally inserted stop screw the point of which is received in a corresponding recess in the rod. This arrangement has proved to result in inconveniences. The dynamometer has to be occasionally checked and adjusted. For each adjustment the stop ring has to be firmly tightened against the shoulder of the rod. As a result, the thread will eventually be deformed and the recess for the stop screw will no longer correspond to the position in which the stop ring should be supported against the shoulder of the rod. Consequently, the force exerted by the disc springs will be changed and the reading of the displacement of the rod will be wrong. This inconvenience is especially obvious in case of high loads.

The dynamometer according to the invention avoids this inconvenience and is characterized in its broadest aspect in that the stop means consists of a piston screwed onto a threaded portion of the rod and lockable thereto in fixed position and of a ring located between the locked piston and the spring elements and screwed onto the thread of the rod in contact with the piston, said ring permitting the piston to be screwed into said position without being tightened and consequently without wear of the thread of the piston.

The arrangement according to the invention eliminates the inconveniences of the prior-art dynamometer due to the fact that the piston always can assume a fixed position on the draw-rod, that is, a position fitted to the stop mean, such as a screw, for the piston. The piston can be freely screwed into this position without being tightened and without damage to the thread even in case of many repeated adjustments. When the ring is screwed into contact with the piston the upper face of the thread of the piston will without turning be pressed against the lower face of the thread of the rod. As far as the ring is concerned the opposite faces of the cooperating threads will be pressed against each other. It follows therefrom that the thread of the piston will not be subjected to wear. Wear of the thread of the ring as a result of tightening of the ring is of no consequence as far as adjustment is concerned because the thickness of the ring will not be changed. Owing to the fact that the rod need not have a shoulder for engagement with the previously used stop ring the thread for the piston and the ring can be located on a portion of the rod which has the same diameter as the remaining portion of the rod. This results in that the thread has a greater supporting surface and that the threaded portion can have the same tensile strength as the rod itself.

Preferably the ring is secured against unscrewing by a member which is carried by the piston and frictionally engages the periphery of the ring. In this way the ring can be secured against turning without the provision of a set screw in the ring.

The invention will be described more closely hereinbelow with reference to an embodiment thereof exemplified in the annexed drawing.

FIG. 1 is a partially sectional elevation of the dynamometer, and FIG. 2 is a sectional view taken along the line II—II in FIG. 1.

Reference numeral 1 denotes the cylindrical casing of the apparatus to one end of which a fixing yoke 2 or the like is secured by threads. At the other end a bottom ring 4 is screwed into an internal thread 3, and this end is covered by a bottom plate 5 through which pass a plurality of fixing screws 6 which are screwed into the bottom ring 4. The draw-rod indicated at 7 has a hole 8 for a fixing bolt or the like. By means of the members 2 and 7, 8 the dynamometer is inserted between two parts for measuring the tensile force or load acting thereon.

The draw-rod has a threaded portion 9 the outside diameter of which is substantially equal to the general diameter of the draw-rod. Screwed onto this threaded portion area piston 10 and a ring 11 which together form a stop for a plurality of annular conical disc springs 12 surrounding the draw-rod. At the opposite or outer side the set of springs bears on a supporting ring 13 which rests on the bottom ring 4. Thin flat bars 13a are secured to the supporting ring 13 and guide the disc springs 12 at their peripheries.

An annular fixed flange 14 is provided in the casing. Inserted between this flange and the piston 10 is a disc spring 16 which serves as a resilient protective stop, for instance in case of breakage of the line or the like attached to the draw-rod or in case of rapid decrease of the load for some reason so that the compressed disc springs would force the draw-rod inward.

When the draw-rod is under tension it is displaced in an outward direction under the compression of the disc springs. The length of the displacement corresponding to the magnitude of the tensile force can be indicated in a conventional manner, for instance read off from a measuring scale. Such a device is generally denoted at C. Screwed axially into the inner end of the draw-rod is a bolt 17 with a flat screw-thread 18 having a long pitch and engaging the threaded hub of a drum 19 which has an external measuring scale and is secured against axial displacement. The scale is visible through a window 20 and adapted to the turning movement imparted to the drum via the thread 18 upon displacement of the draw-rod.

From the above it will be seen that the stop means for the disc springs in accordance with the invention consists of the piston 10 and the ring 11 screwed onto the thread 9. After the piston has been screwed into a position corresponding to the desired initial pressure exerted by the disc springs the piston is secured in this position by stop screws 21 which axially extend through the thread 9. Then the ring 11 is tightly screwed into contact with the piston preferably such that the ring is held pressed against the piston by a force which is substantially equal to or greater than the permissible maximum tensile force on the dynamometer. In this position the ring is secured against turning movement by a friction block 22 which by means of a screw 23 screwed into the piston is pressed against the periphery of the ring. The block 22 is movable in a longitudinal groove 24 in the casing 1 and prevents turning of the piston 10 during axial displacements thereof.

For adjustment and inspection of the dynamometer the draw-rod and the set of springs are first removed from the casing and then it is only necessary to unscrew the stop screws 21, to release the pressure exerted by the ring 11 and to unscrew the piston 10 and the ring 11. To assemble the parts again, the piston is screwed without resistance into the position for entering the stop screws 21 whereupon the ring is pressed against the piston as mentioned above. The portion of the threads which hold the piston will not be subjected to wear, and the position of the piston will always be exact.

In order to enable the screw thread 9 to be cut, there is required a run-out of thread formed by the reduced portion 25 of the draw-rod. The depth of the reduced portion is not greater than that required for cutting the screw thread, and the reduced portion merges smoothly at 26 into the general diameter of the rod so as to avoid weakening of the draw-rod as far as possible.

Fine adjustments of the spring force can be effected by means of the bottom ring 4 which is threaded at a large diameter and consequently very resistant to stresses.

What is claimed is:

1. A dynamometer comprising a casing, a drawrod longitudinally displaceable in the casing, spring elements against the action of which the drawrod is longitudinally displaceable, means for indicating the force with which the drawrod acts against the spring elements, the spring elements surrounding the drawrod, stop means on the drawrod against which the spring elements bear in one direction, means on the casing against which the spring elements bear in the opposite direction, said stop means comprising a piston screw-threadedly carried by the rod, means for locking the piston on the rod in fixed position, and a ring screw-threadedly carried by the rod and disposed between the locked piston and the spring elements in contact with the piston, said ring permitting the piston to be screwed into said position without being tightened and without wear on the threads between the piston and the rod.

2. A dynamometer as claimed in claim 1, and means mounting said means on the casing against which the spring elements act for axial adjustment relative to the casing.

3. A dynamometer as claimed in claim 1, said ring being pressed against the piston with a force which is at least as great as the permissible maximum load on the drawrod.

4. A dynamometer as claimed in claim 1, in which the outside diameter of the thread of the drawrod for the piston and the ring is substantially equal to the general diameter of the drawrod.

5. A dynamometer as claimed in claim 1, and a detent carried by the piston and engageable with the periphery of the ring to maintain the ring against rotation relative to the piston.

6. A dynamometer as claimed in claim 5, and guide means on the casing in which said detent is slidable to prevent rotation of the piston relative to the casing.

References Cited

UNITED STATES PATENTS

| 2,673,464 | 3/1954 | Zublin | 73—141 |
| 2,703,980 | 3/1955 | Tell | 73—141 |

RICHARD C. QUEISSER, *Primary Examiner.*

CHARLES A. RUEHL, *Examiner.*